(12) United States Patent
Ewen

(10) Patent No.: US 7,874,081 B2
(45) Date of Patent: Jan. 25, 2011

(54) FLOW CONTROL IN A WASHING AND CENTRIFUGAL DRYING SYSTEM

(75) Inventor: Philip John Ewen, Roseville (AU)

(73) Assignee: Key Technology, Inc., Walla Walla, WA (US)

( * ) Notice: Subject to any disclaimer, the term of this patent is extended or adjusted under 35 U.S.C. 154(b) by 1014 days.

(21) Appl. No.: 11/584,464

(22) Filed: Oct. 20, 2006

(65) Prior Publication Data

US 2007/0068555 A1 Mar. 29, 2007

(30) Foreign Application Priority Data

Apr. 26, 2005 (WO) .............. PCT/AU2005/000589

(51) Int. Cl.
*F26B 7/00* (2006.01)
(52) U.S. Cl. .............................. 34/381; 34/427; 34/482
(58) Field of Classification Search .................. 34/329, 34/343, 348, 357, 380, 381, 427, 443, 482; 426/665, 443, 465
See application file for complete search history.

(56) References Cited

U.S. PATENT DOCUMENTS 1,957,964 A * 5/1934 Jones ........................ 426/665

FOREIGN PATENT DOCUMENTS

| EP | 285235 A1 | * | 10/1988 |
| EP | 1440624 A2 | | 7/2004 |
| GB | 2246851 A | | 2/1992 |
| JP | 62061574 A | * | 3/1987 |
| JP | 06038875 A | * | 2/1994 |

* cited by examiner

*Primary Examiner*—Jiping Lu
(74) *Attorney, Agent, or Firm*—Wells St. John P.S.

(57) ABSTRACT

A method of filling a drying system 24 with product comprises providing a washing unit 22, and a drier or driers 26a, 26b arranged such that one at a time the driers 26a, 26b receive product 48 discharged from the output of the washing unit 22. The washing unit 22 is configured to receive product 48 which is continuously weighed 104 as it is delivered to the washing unit. The product is washed in the washing unit 22 by being passed through the washing unit at a substantially constant speed, allowing the arrival time at the drier 26a, 26b to be predicted. The weight of product loaded into the drier is regulated by controlling the flow of product into the drier.

8 Claims, 5 Drawing Sheets

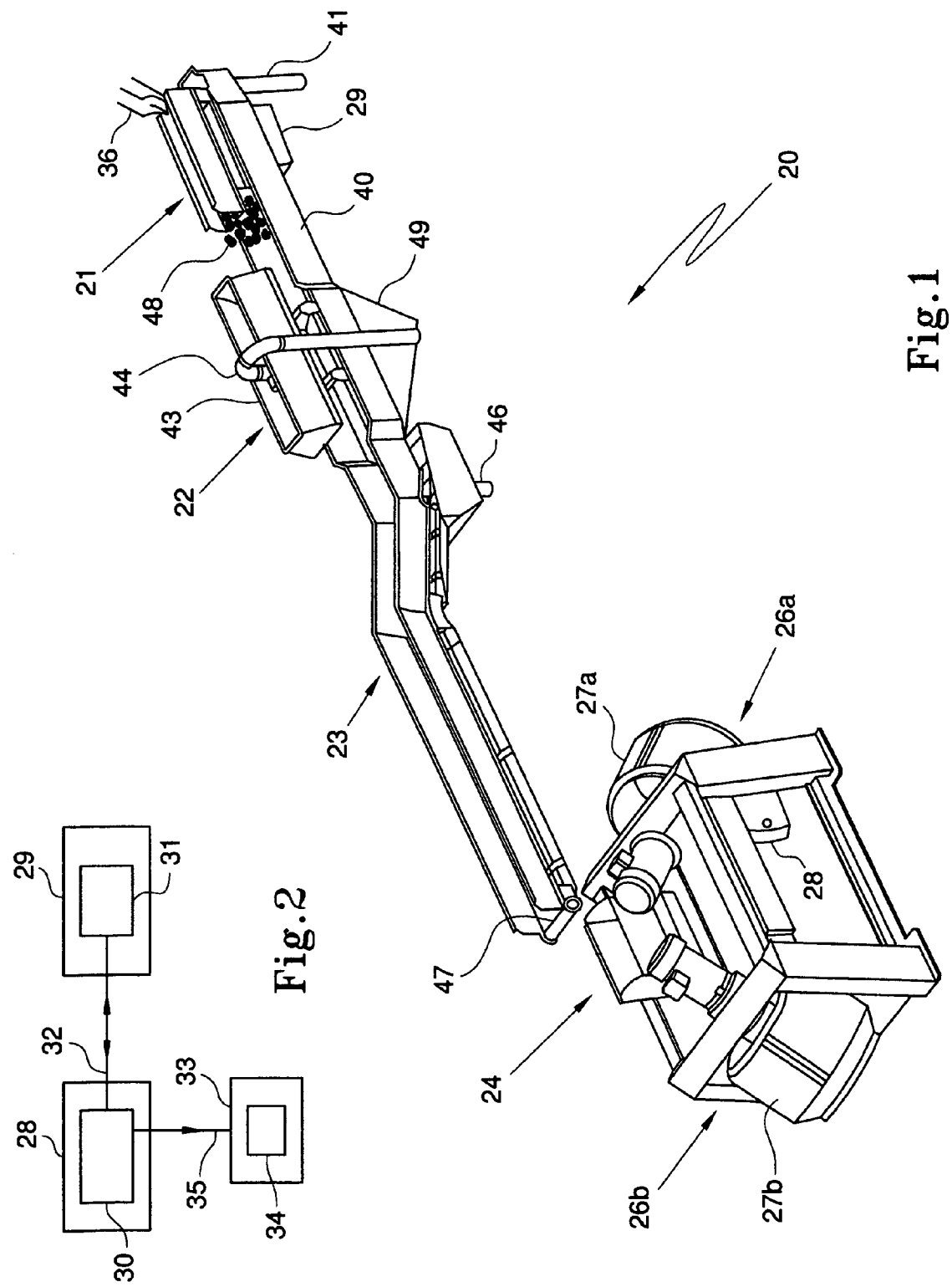

FLOW CONTROL IN A WASHING AND CENTRIFUGAL DRYING SYSTEM

CROSS-REFERENCE TO RELATED APPLICATIONS

The present application claims priority from Provisional Patent Application No. 2004902187 filed on Apr. 23, 2004 the content of which is incorporated herein by reference, and to corresponding PCT Patent Application No. PCT/AU2005/000589 filed on Apr. 26, 2005.

INTRODUCTION

A system for washing and drying of bulk materials or product is presented and in particular an improvement will be described which assists the system to achieve efficient throughput. Specifically, the system is preferably for use in drying cut farm produce such as vegetables although it is also adaptable to other uses.

BACKGROUND

The use of centrifuges to extract liquid is well known. In the field of vegetable processing, driers with rotatably mounted drums having perforate walls have been used to centrifugally dry vegetables prior to packing. Such known devices have generally been ergonomically inefficient in terms of filling and emptying.

The background art includes a perforate open-ended cylinder adapted to be rotated about its longitudinal axis. Also mounted for rotation with the cylinder is a circular disk disposed intermediate to the ends of the cylinder in a plane normal to the axis of the cylinder such that an annular gap is defined between the periphery of the disk and the cylinder's inner wall. In use, the cylinder axis is oriented on an incline and produce is gravity fed through the upper open end of the rotating cylinder and strikes the rotating cylinder. Due to the rotation of the cylinder the produce is centrifugally held against the wall and is layered along the cylinder wall until the capacity of the cylinder is reached, as typically indicated by the produce reaching a predetermined level in the drier. During the filling and drying stages of the drier cycle excess water is centrifugally drained through the perforations in the cylinder wall. The cylinder is then decelerated and produce falls through the lower open end of the cylinder.

When filling the cylinder it is important that the cylinder be loaded to the optimum weight of material to be dried. Under-filling the cylinder relative to the optimum weight results in lower throughput per cycle while over-filling will lead to inefficient drying and potentially longer drying times and may cause instability of the cylinder on its mounts and could result in damage of the drier.

SUMMARY OF THE INVENTION

The present invention provides a method of filling a drying system with product comprising:

providing a washing unit configured to receive and discharge product;

providing a drier located in product receiving relation from the washing unit;

continuously weighing product as it is delivered to the washing unit;

washing the product by passing the product through the washing unit at a substantially constant speed;

removing the product from the washing unit and loading the product into the drier; and controlling the product flow into the drier to regulate the weight of product loaded into the drier.

The present invention further provides a method of filling a drying system with product comprising:

providing a washing unit;

providing a drier located in product receiving relation from the washing unit;

delivering product to the washing unit;

washing the product by passing the product through the washing unit at a substantially constant speed;

removing the product from the washing unit;

loading the product into the drier;

calculating a time required for the product currently being delivered to the washing unit to reach the drier; and predicting the availability of the drier for loading when the calculated period of time has elapsed;

and wherein if the drier is predicted not to be available when the calculated period of time has elapsed, the delivery of product to the washing unit is interrupted until another time when the drier can be predicted to be available.

The present invention also provides a processing system for product comprising:

a washing unit having an input, an output and configured to provide a substantially constant product passage time;

a continuous weighing device configured to continuously receive a supply of product and weigh the product passing through it and further configured to deliver the product at a substantially constant mass rate, and wherein the continuous weighing device operates to feed product at said constant mass rate into the input of the washing unit;

a drier located at the output of the washing unit and configured to continuously receive the supply of product after the product has passed from the washing unit and to dry the product; and a control system operable to set the rate at which the weighing unit delivers product to the washing unit and further operable to co-ordinate the length of time the product flows into the drier.

The present invention still further provides a processing system for product comprising:

a washing unit having an input and output for product, and configured to provide a substantially constant product passage time;

a delivery system configured to deliver the product into the input of the washing unit;

a drier located at the output of the washing unit, and operable to receive product from the washing unit and to dry the product; and a control system configured to predict future drier availability and to control the delivery system to regulate product flow into the washing unit, the control system being operable to calculate a time period required for the product currently being delivered to the washing unit to reach the drier and to make a prediction regarding the availability of the drier for loading when the calculated time period has elapsed, and whereby, if the drier is predicted to be unavailable when the calculated time period has elapsed, the controller is configured to interrupt delivery of the product to the washing unit until a time when the drier can be predicted to be available.

Preferably the system includes two or more driers and the flow of product is switched from one drier to another when the one drier is full.

Preferably also the delivery of product to the washer/chiller is interrupted when the quantity of product in the washer/chiller is equal to the requirement of the drier being filled and another drier is not anticipated to be ready to accept product when the drier being filled is full.

The quantity of product in the washer/chiller is determined by continuously weighing the product on a weighing device as it is delivered to the washer/chiller. When the product delivered to the washer/chiller is sufficient to fill the current drier, the delivery of product to the weighing unit is interrupted thereby interrupting the supply to the washer/chiller.

The water in the washer/chiller is maintained at a temperature selected to chill the product to a desired degree as the product passes through the washer/chiller.

Embodiments of the invention may also incorporate multiple washer/chillers connected in series where particular washing requirements exist.

BRIEF DESCRIPTION OF THE DRAWINGS

An embodiment of the invention will now be described by way of example with reference to the accompanying drawings in which:

FIG. 1 shows a washing system including a weigh belt a washer/chiller and a cluster of two centrifugal driers;

FIG. 2 is a block diagram of the controllers of the various equipment stages and their interconnections;

DETAILED DESCRIPTION OF A PREFERRED EMBODIMENT

Referring to FIG. 1, a direct stream material processing system 20 for product 48 and a method of processing is described below, which enables washer and drier components of processing system to be regulated, in a highly efficient, modular system. For simplicity the system and process will be described for a two drum drier system 24, but 1, 4 and 8 drum driers are also available and the basic process can be modified to suit each of these.

Figure 3:
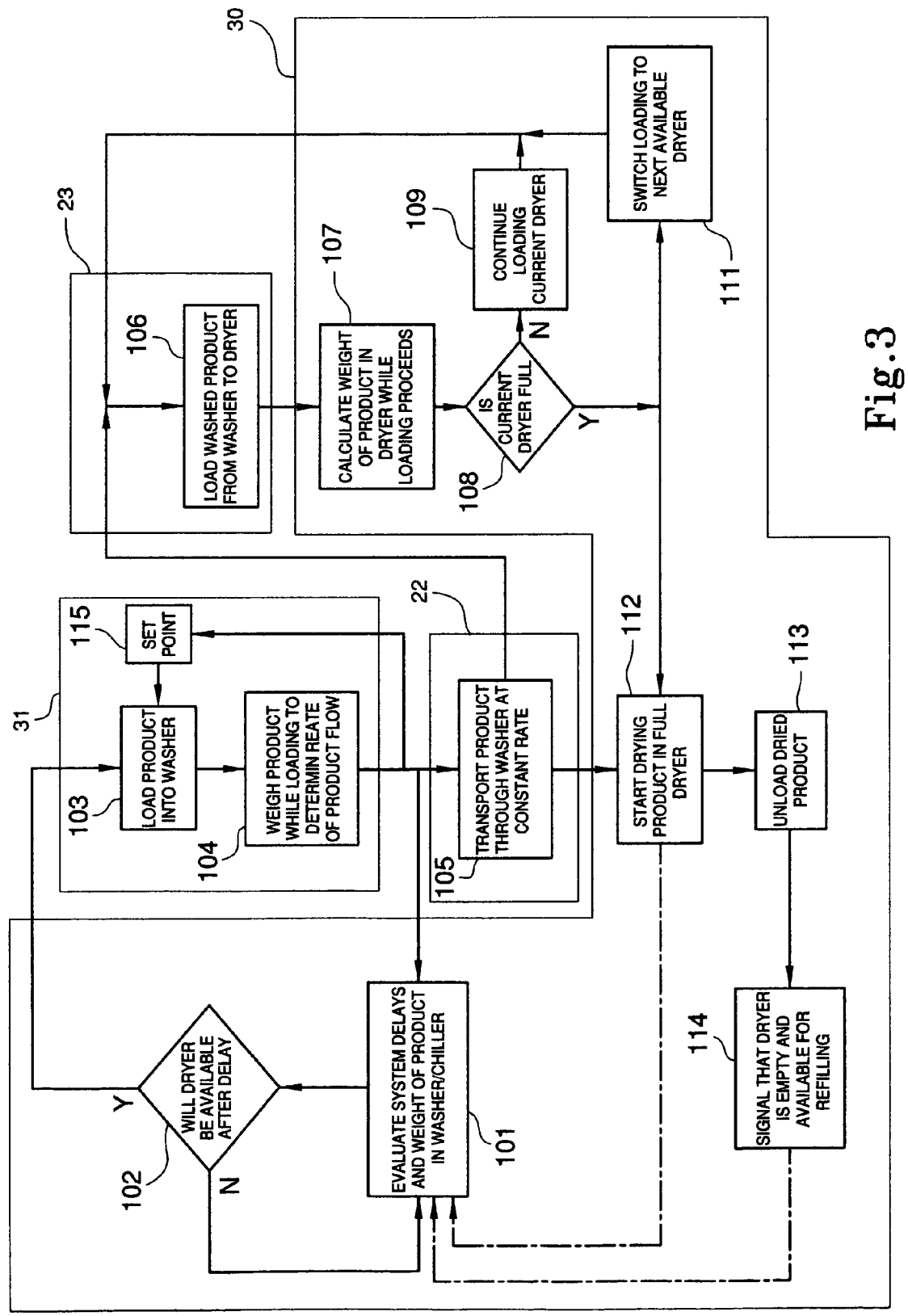
FIG. 3 is a flow chart of the washing and drying process.

Referring to FIGS. 1, 2 and 3, the input point of the direct stream system 20 is the weigh belt 21 onto which product 48 to be washed is loaded. The weigh belt allows product to be weighed 104 as it is loaded 103 into a washer/chiller 22, which washes the product in a stream of chilled water. By weighing the product as it is loaded into the washer/chiller 22, the loading process can be controlled to create an even flow 105 of product through the washer/chiller. Product 48 is weighed 104 into washer/chiller(s) 22 at a substantially constant rate (by weight). The rate of product flow is determined by a Drier Program Logic Controller (PLC) 30 (housed in control box 28) which sets the maximum through-put rate possible for the particular product being processed. For example, when processing shred lettuce the washer can be fed with product 48 at a rate of 4.5 pounds per second (approx 10 kg/sec). The weigh belt 21 has its own weigher PLC 31 (housed in control box 29) which is in communication with the Drier PLC 30 via a communications line 32. The weigher PLC 31 uses as a set point 115 the rate set as a target rate by the Drier PLC 30 and compares flow measured (i.e. weighed 104) on the weigh belt 21 against the set point 115, in order to control the belt speed to maintain the flow within close tolerances about the set point. The product is transported 105 through the washer/chiller 22 and then lifted from the washer/chiller 22 by a transfer system 23 and loaded 106 into a drum 27a, 27b of one of the driers 26a, 26b. The product is transported through the washer/chiller 22 at a substantially constant speed which allows each drum 27a, 27b to fill in the optimum time (~30 seconds). The speed of transport through the washer/chiller 22 is determined by the rate of flow of water cycling through the system.

The Drier PLC 30 monitors the actual rate of feed to the washer/chiller 22 (i.e. the instantaneously measured weights) and after compensating for transport delay (105, 106) through the washer/chiller and transfer system 23 it integrates the flow rate over time to determine 107 the accumulated weight of product in the first drum 27a (i.e. the drum of the drier currently loading). The Drier PLC 30 monitors 108 the loaded weight (predicted in 107) and if the current drum is not full, allows loading to continue 109. When the first drum 27a is full, the Drier PLC 30 causes the product flow to be diverted 111 to the next available drier which in this case would be the second drier 26b as described below. If product cannot be supplied from the washer/chiller 22 at the required rate, due to, for example, an interruption of supply at the input to the weigh belt 21, the drier PLC 30 will extend the drier fill time and continue loading 109 the current drier until the drier load weight reaches a value required for a predetermined shred product profile of the product being washed and dried.

Once the Drier PLC 30 determines 108 that the drum 27a is filled, drying is commenced 112 in the full drier and loading is switched 111 to the drum of next drier 26b which will thereafter be considered as the current drier until in turn it becomes full. After a predetermined drying cycle (tailored to the product being washed), the dried product is unloaded 113 and the now empty drum 27a of the drier 26a becomes available 114 for another load.

The drier PLC 30 evaluates 101 the current system delays (i.e. the delay of product flowing through the washer/chiller and the time before the next drier will become available) and the amount of product currently in the washer/chiller 22 and then predicts availability 102 of a drier 26a, 26b to receive the product 42 currently being loaded into the washer/chiller 22 by:

1. calculating whether there is already enough product in the washer/chiller 22 to fill the drum of the current drier (i.e. drier 26b); and
2. whether another drier (i.e. drier 26a) will become available before the drum of the current drier (drier 26b) is full.

If the Drier PLC 30 predicts 102 that there will not be a drier 26a, 26b available for the product about to be fed into the washer/chiller 22, it stops the introduction of product via a feed apparatus 36 from the preparation area to the weigh belt 21. The drier PLC 30 stops the feed by signalling via a communications line 35 to a feed apparatus controller 34 (housed in a feed apparatus controller box 33—ref FIG. 2). This action is taken in case it is not possible to commence filling another drum immediately after the currently filling drum is filled.

The drier PLC 30 calculates when the first drier 26a will be ready again and supply of product to the weigh belt 21 is not recommenced until it can be determined that a drier 26a, 26b will be available to dry the product when it reaches the washer output transfer system 23. The drier PLC 30 causes feed into the washer/chiller 22 at the appropriate time such that as soon as the first drum 27a is again ready to fill, product is streaming into it from the transfer system 23. This process then repeats for the drums 27a, 27b of each of the two driers 26a, 26b, the feed stopping as required in anticipation of a delay before the next drum is ready to load and restarting in time to have product reach the next drum just as it is ready to start loading.

Figure 4:
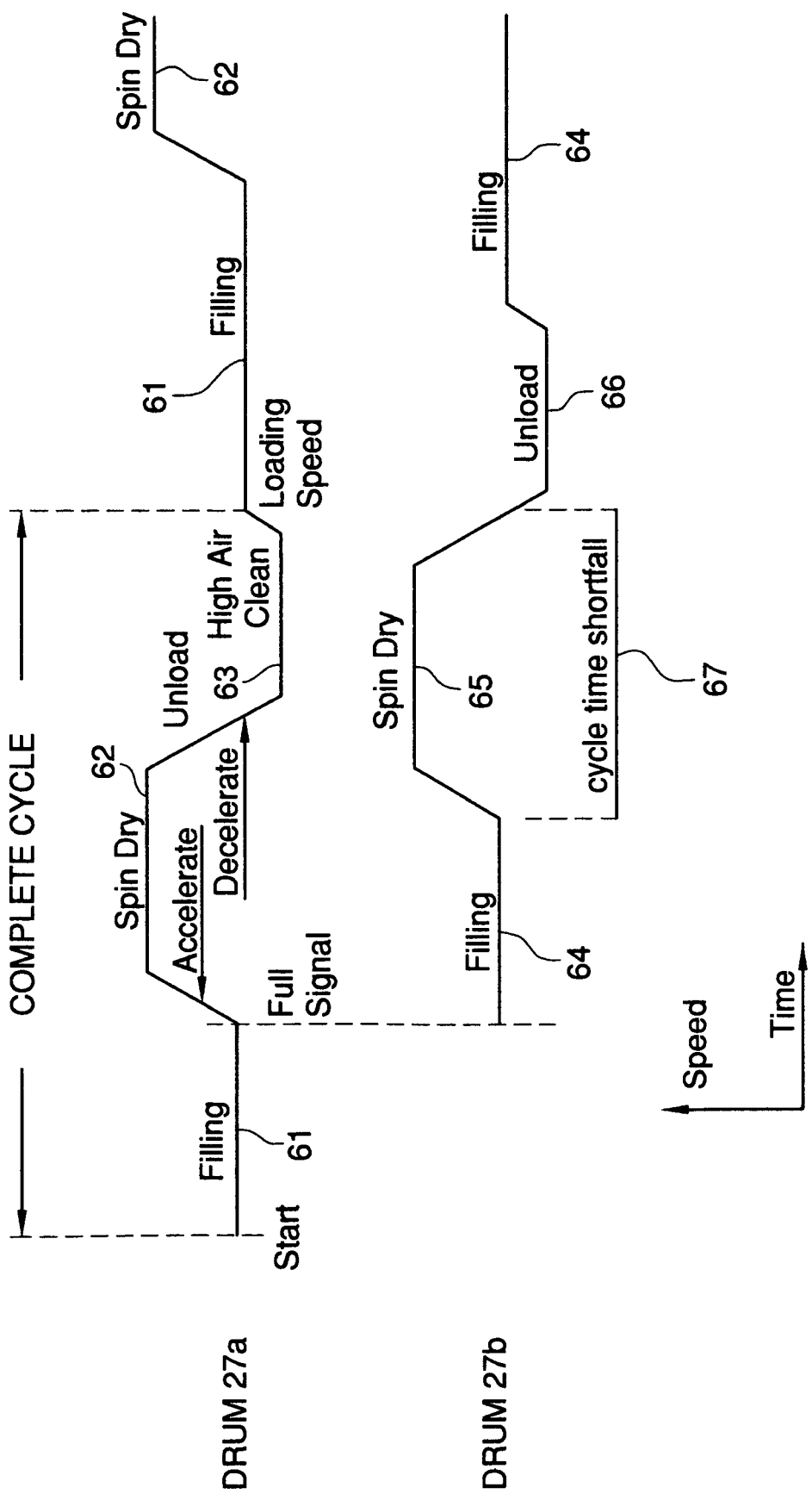
FIG. 4 is a timing diagram for a drying cycle in a cluster of 2 centrifugal driers.
Figure 5:
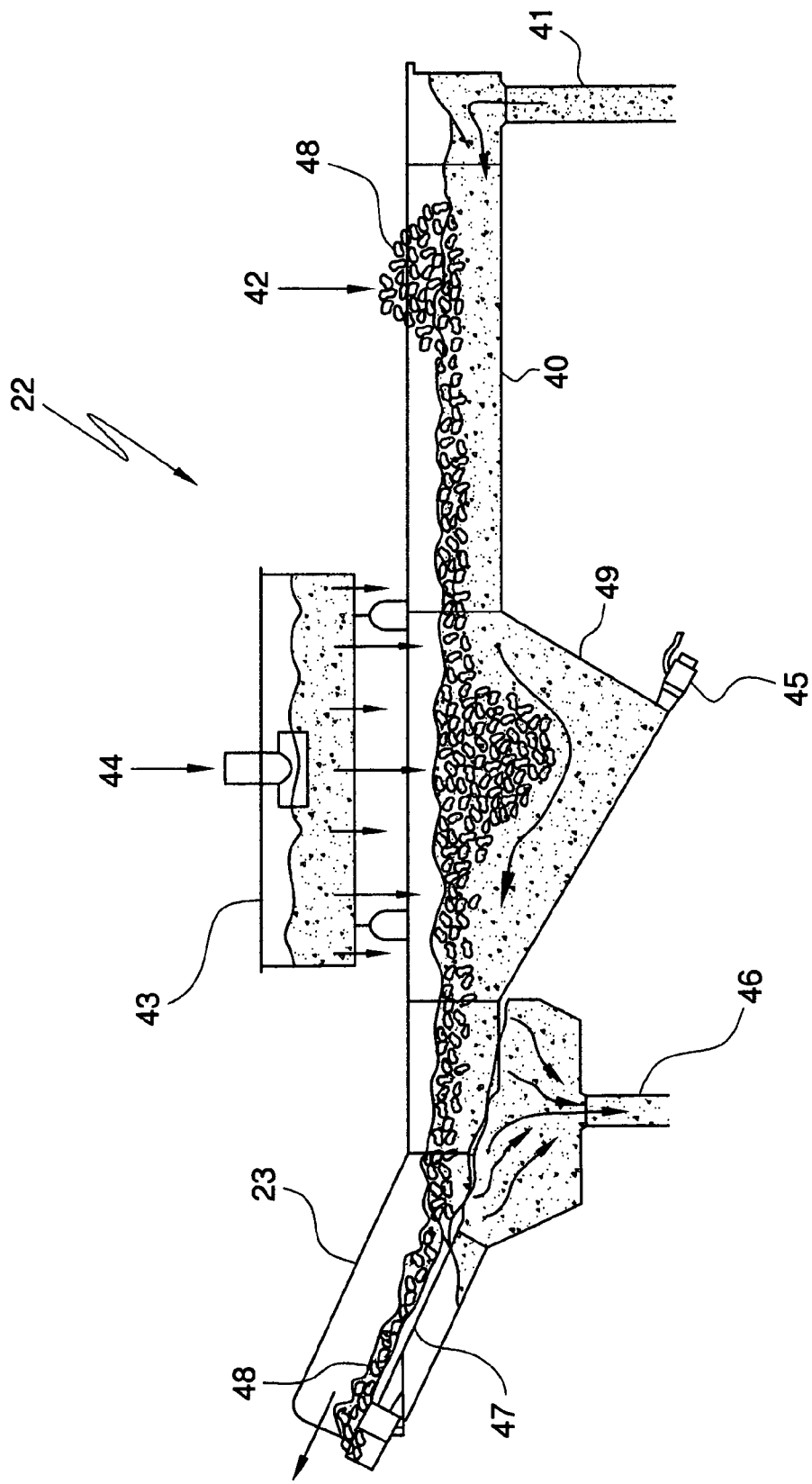
FIG. 5 is a diagrammatic representation of the washer/chiller of FIG. 1.

The timing of the cycling of the driers is illustrated in FIG. 4 from which it can be seen that the filling period 61 for the first drum 27*a* is immediately followed by the spin dry period 62 of the first drum 27*a* and simultaneously the filling period 64 of the second drum 27*b*. The filling period 64 of the second drum 27*b* commences immediately follow the filling 61 of the first drum 27*a*. When the second drum 27*b* has finished filling 64 the first drum 27*a* will not usually be ready to start filling again as the drying time 62, 65 of each drier is normally longer than the sum of the fill time 61, 64 and the unload time 63, 66. This is indicated as the "cycle time shortfall" 67 in the timing diagram of FIG. 4. To accommodate this, the feed is stopped in time to interrupt supply to the drums from the washer/chiller 22 and transfer belt 23 just as the second drum 27*b* fills. The feed is then re-established in time to commence filling the first drum 27*a* again at the end of its previous cycle (i.e. when unloading is complete).

Effectively this method enables the quantity of product for a drying batch to be weighed prior to the wash, and its progress to the respective drum is timed to coincide with the drum's requirements. This also enables precise control of product flow and substantially eliminates any possibility of clumps in the wash and the need for wet product storage at any stage. As the washer/chiller 22 used in the direct stream system is very consistent in terms of transit time and creates good product particle separation, product can be pre-introduced into the flume to ensure maximum drier efficiency (i.e. as soon as a drum is ready to receive product, the product is flowing into the drum and doing so as fast as possible).

Optimally, for a system of n number of driers the filling time will be equal to, or slightly less than, the 1/n multiplied by the cycle time of a drier, such that there are substantially no feed delays and the driers are cycled with a minimum delay between emptying and refilling. Obviously in the case of a single drum system as with the two drum system described above, the feed to the washer/chiller will have to be interrupted during each fill of the drum, however with 4 and 8 drum systems it is possible to achieve constant input. In the case of larger systems it would be necessary to increase washer/chiller throughput to keep the drums operating constantly. This may be achieved by increasing the size of the washer/chiller or by employing parallel washer/chiller units.

Weigh Belt

The direct stream system uses a light to medium duty weigh belt feeder designed to accurately weigh various products on a continuous basis. The weight belt employs a direct support weighing mechanism which utilises a sealed load cell and typically provides an accuracy of +/−0.25% to +/−0.5% for weighing and rate control.

Washer/Chiller

As illustrated in detail in FIG. 4, the washer/chiller 22 comprises a trough 40 into which chilled washing water is pumped through inlet 41 to create a substantially constant flow through the trough. Product 48 to be washed is deposited into the trough at an input point 42 (under the output of the weigh belt 21). As the product 48 flows along the trough 40 with the water, additional water is showered onto the product from the distributor 43 which is fed with water through inlet 44. The water is recycled through drain 46 and filtered before being returned to inlets 41 and 44. An auto drain 45 enables product which sinks to the bottom of the sump 49 to be removed from the system before the water is fouled. The washed product emerges from the trough via the conveyor 47 of the transfer system 23 at the output of the washer/chiller.

Driers

Figure 6:
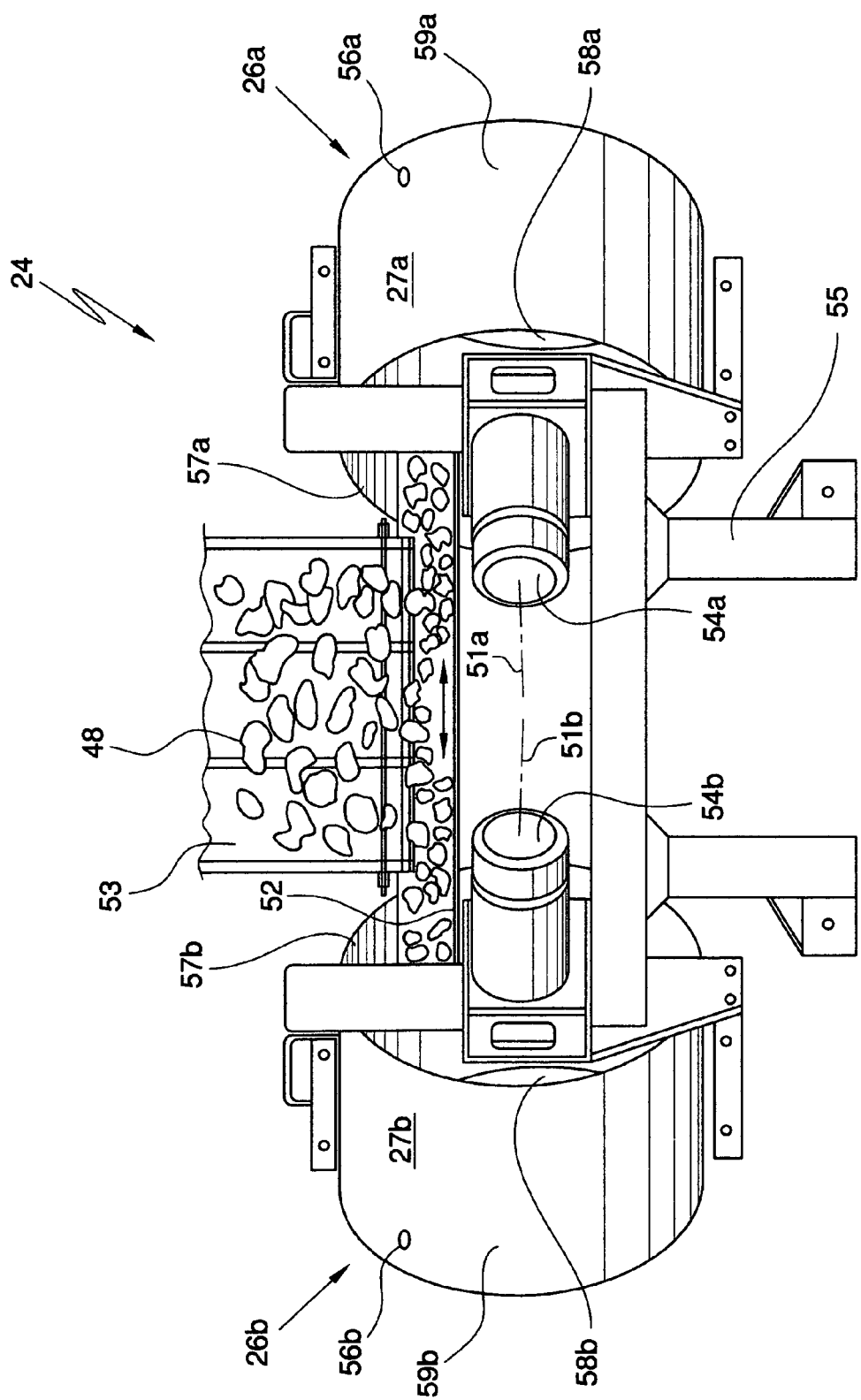
FIG. 6 illustrates, in greater detail, a drier system having a pair of driers with centrifugal drying drums.

FIG. 6 illustrates a drying system 24 incorporating a pair of centrifugal driers 26*a*, 26*b* of the type employed in the system of FIG. 1. The drums 27*a*, 27*b* of each of the driers 26*a*, 26*b* are respectively rotatably mounted in frame 55 which is of a robust construction to resist any eccentric loading of the drums. Moreover, frame 55 is used to mount electric motors 54*a*, 54*b* which rotatably drive their respective drums 27*a*, 27*b*. In this embodiment, feed conveyor 52 is continuously fed by a second conveyor 53. The second conveyor 53 is a shaker or vibrating conveyor which evenly distributes the cut vegetables and facilitates uniform feeding to feed conveyor 52.

The feed conveyor 52 can be driven to supply product 48 to one drum 27*a* and then reversed to supply product 48 to the second drum 27*b* whilst the first drum 26 goes through its drying and emptying cycles.

The drums 27*a*, 27*b* are adapted to be rotated about their respective longitudinal axes 51*a*, 51*b* inclined with respect to the vertical or "vertically canted." The drums 27*a*, 27*b* are open at their upper ends 57*a*, 57*b* to receive product 48, such as vegetables, transported by feed conveyor 52. The lower end of drums 27*a*, 27*b* include lower openings 58*a*, 58*b* to facilitate dispensing of the product after it has been dried. The wall 59*a*, 59*b* of each drum 27*a*, 27*b* is perforated with a plurality of small perforations 56*a*, 56*b* (only one shown in each drum for clarity) to allow water to be expelled from the drum.

In use, the drums 27*a*, 27*b* are rotated at a low speed whilst product 48, in the form of cut vegetables etc, is introduced into the drum by feed conveyor 52.

When product is initially introduced into a first one of the empty drums 27*a*, the product slides in a helical path with respect to the perforate wall 59*a* to the bottom of the drum where the product will commence layering up the wall of the drum until the drum is filled to its optimum level. When the first drum 27*a* is full the feed conveyor 52 is stopped or reversed and the drum is accelerated to dry the product 48 in the normal manner Once the drying cycle is complete, the first drum 27*a* is decelerated and the dried product 48 is allowed to fall through lower opening 58*a* by gravity. As the dried product tends to adhere to the inner wall of the drum 27*a*, 27*b*, dispensing of the dried matter can be assisted by the optional introduction of a blast of air or other suitable generally dry gas. At the appropriate time, the loading/drying/unloading operation for the second drum 27*b* is the same as described for the first drum 27*a*.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of filling a drying system with product comprising:
    providing a washing unit;
    providing a drier located in product receiving relation from the washing unit;
    delivering product to the washing unit;
    washing the product by passing the product through the washing unit at a substantially constant speed;
    removing the product from the washing unit;
    loading the product into the drier;
    calculating a time required for the product currently being delivered to the washing unit to reach the drier; and predicting the availability of the drier for loading when the calculated period of time has elapsed;

and wherein if the drier is predicted not to be available when the calculated period of time has elapsed, the delivery of product to the washing unit is interrupted until another time when the drier can be predicted to be available.

2. The method of claim 1 further comprising:

providing a plurality of driers; and calculating a time required for the product currently being delivered to the washing unit to reach the drying system;

predicting the availability of any drier of the drying system for loading when the calculated period of time has elapsed;

and wherein if no drier is predicted to be available when the calculated period of time has elapsed, the delivery of product to the washing unit is interrupted until another time when any one of the plurality of driers are predicted to be available.

3. The method of claim 1, wherein the washing unit uses chilled water to wash the product whereby the product is maintained at a chilled temperature during the washing step.

4. The method of claim 1, and further comprising providing a continuous weighing device, delivering product to the washing unit via the continuous weighing device and interrupting delivery of the product to the washing unit by interrupting delivery to the continuous weighing device.

5. The method of claim 1, and further comprising providing a plurality of washing units.

6. The method of claim 1, and further comprising providing a plurality of washing units, and wherein the washing units are arranged in series.

7. A method for filling a drying system with product comprising:

providing a washing unit configured to receive and discharge a product;

providing a drier located in product receiving relative to the washing unit;

continuously weighing product as it is delivered to the washing unit;

washing the product by passing the product through the washing unit at a substantially constant speed;

removing the now washed product from the washing unit and loading the washed product into the drier;

controlling the washed product flow into the drier to regulate the weight of washed product loaded into the drier;

calculating a period of time required for the washed product currently being delivered to the washing unit to reach the drier;

predicting the availability of the drier for loading when the calculated period of time has elapsed;

and wherein if the drier is predicted not to be available when the calculated period of time has elapsed then the delivery of the washed product to the washing unit is interrupted until another time when the drier can be predicted to be available.

8. The method of claim 1, and further comprising:

providing a plurality of driers;

calculating a time required for the washed product currently being delivered to the washing unit to reach the drying system;

predicting the availability of any drier of the plurality of driers for loading when the calculated period of time has elapsed;

and wherein if no drier is predicted to be available when the calculated period of time has elapsed then the delivery of the product to the washing unit is interrupted until another time when any one of the plurality of driers are predicted to be available.

* * * * *